United States Patent [19]
Grimes, III et al.

[11] Patent Number: 5,411,233
[45] Date of Patent: May 2, 1995

[54] VEHICLE COAT HOOK ASSEMBLY

[75] Inventors: Robert W. Grimes, III, Grand Haven; Douglas A. Fischer, Grand Rapids; Nels R. Smith, Holland; Larry E. Mathias, Hudsonville, all of Mich.

[73] Assignee: Prince Corporation, Holland, Mich.

[21] Appl. No.: 6,613

[22] Filed: Jan. 21, 1993

[51] Int. Cl.⁶ .............................................. B60R 7/00
[52] U.S. Cl. ........................... 248/305; 224/313
[58] Field of Search ............... 248/613, 610, 339, 305, 248/290; 224/313, 311, 42.46 A, 42.46 R

[56] References Cited

U.S. PATENT DOCUMENTS

| | | | |
|---|---|---|---|
| 2,232,094 | 2/1941 | Canfield | 248/339 |
| 2,589,726 | 3/1952 | Neufeld | 248/613 X |
| 3,424,418 | 1/1969 | Freedman et al. | 248/305 X |
| 3,463,435 | 8/1969 | McGrew, Jr. | 248/339 X |
| 3,845,890 | 11/1974 | Johns | 248/339 X |
| 4,720,028 | 1/1988 | Takemura et al. | 224/313 X |

FOREIGN PATENT DOCUMENTS

| | | | |
|---|---|---|---|
| 1636167 | 9/1969 | Germany | 248/305 |
| 143820 | 1/1954 | Sweden | 248/613 |

Primary Examiner—Karen J. Chotkowski
Attorney, Agent, or Firm—Price, Heneveld, Cooper, DeWitt & Litton

[57] ABSTRACT

A vehicle coat hook assembly in which the coat hook is spring-biased to normally locate the hook closely adjacent to the header of the vehicle but which is extendable against the bias of the spring to provide more area for hanging a greater number of clothes hangers. In a preferred embodiment, a linearly movable stem is connected to the coat hook. In another embodiment, the coat hook is pivotally mounted.

7 Claims, 3 Drawing Sheets

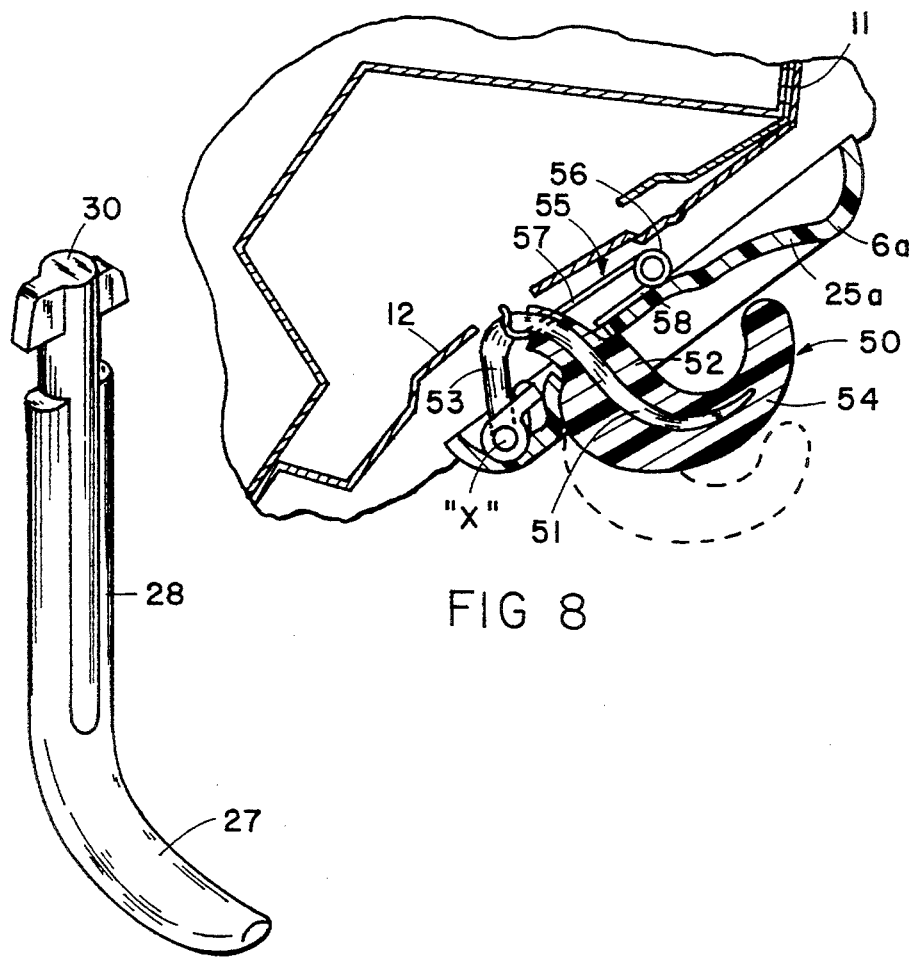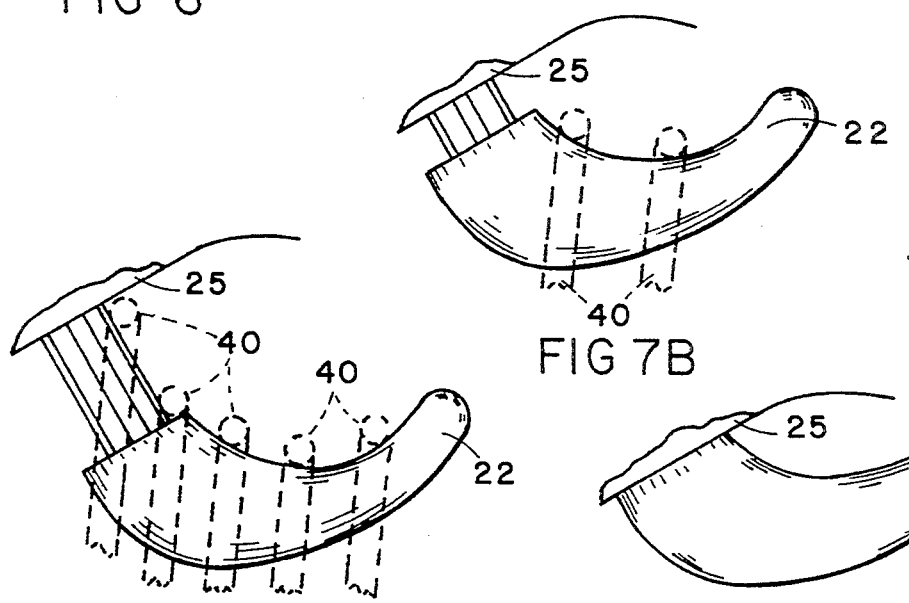

VEHICLE COAT HOOK ASSEMBLY

This invention relates to a coat hook assembly for an automobile vehicle in which the coat hook assembly is mounted on the roof of the vehicle closely adjacent the header for the vehicle roof. More specifically, it relates to such a coat hook which is uniquely biased so as to locate the coat hook as close as possible to the header while, at the same time, providing an expandable area to hold a plurality of coat hangers.

BACKGROUND OF THE INVENTION

In present day vehicles, it is customary to include a coat hook mounted along the edge of the header of an automotive vehicle on which clothes hangers can be hung immediately adjacent the side of the vehicle. One drawback of coat hangers of this type is that they extend into the inside of the vehicle and, because of the danger of a passenger hitting his or her head on the coat hook, it has been necessary to restrict the distance the coat hook extends from the header. As a result, most coat hooks are located closely adjacent to the header providing a very limited number of clothes hangers that can be hung on the coat hook.

SUMMARY OF THE INVENTION

Our invention provides a coat hook for a vehicle which, when not used, is located closely adjacent to the header providing more head room and thus preventing accidental striking of the passenger's head on the hook. This is accomplished by providing the spring biased coat hook that is biased so as to normally locate the hook closely adjacent to the header but which is extendable against the bias of a spring so as to provide more area for clothes hangers, preferably dependable upon the number of clothes hangers and the weight of the hangers on the coat hook.

In our preferred embodiment, the coat hook includes an elongated stem extending from the coat hook into the header with biasing means for biasing the elongated stem in a linear direction along an inclined axis. Preferably, the elongated stem includes a cap on the end thereof and a coil spring surrounding the stem and compressed between the cap and the support for the coat hook. Thus, the stem is forced in a direction toward the roof and the header by the spring to normally hold the coat hook closely adjacent to the header providing maximum head room. This construction permits the coat hook to be extended into the interior of the vehicle against the bias of the coil spring so as to accommodate an increasingly greater number of clothes hangers. The coat hook can be pulled manually outwardly against the bias of the spring or the bias of the spring can be selected so that as additional clothes hangers are hung on the coat hook, the coat hook extends outwardly to accommodate such additional clothes hangers.

In another version of our invention, the coat hook is mounted in the header for rotation from a position closely adjacent the header to different positions located further away from the header thus providing additional area for hanging of additional clothes hangers. In this version, the coat hook has two arms, one extending away from the header in a hook-like fashion and the other arm having an end which is pivoted providing the rotating action for the coat hook. Between the two arms is located a spring member that biases the coat hook portion toward the header to provide maximum head room. The spring element is so located that it permits the coat hook to be pivoted about an axis that is fore and aft of the vehicle so as to afford a greater area for hanging of clothes hangers as the coat hook is pivoted downwardly from the header.

BRIEF DESCRIPTION OF THE DRAWINGS

Referring to the drawings:

FIG. 6 is a perspective view of the metallic part before the insert molded sheath of the part of FIG. 4 is applied;

FIGS. 7a, 7b, and 7c disclose various positions of the coat hook assembly of FIGS. 2 and 3 for different numbers of clothes hangers hanging therefrom; and FIG. 8 is a side-elevational view of another version or embodiment of the spring biased coat hook of this invention.

DESCRIPTION OF THE PREFERRED EMBODIMENT

Figure 1:
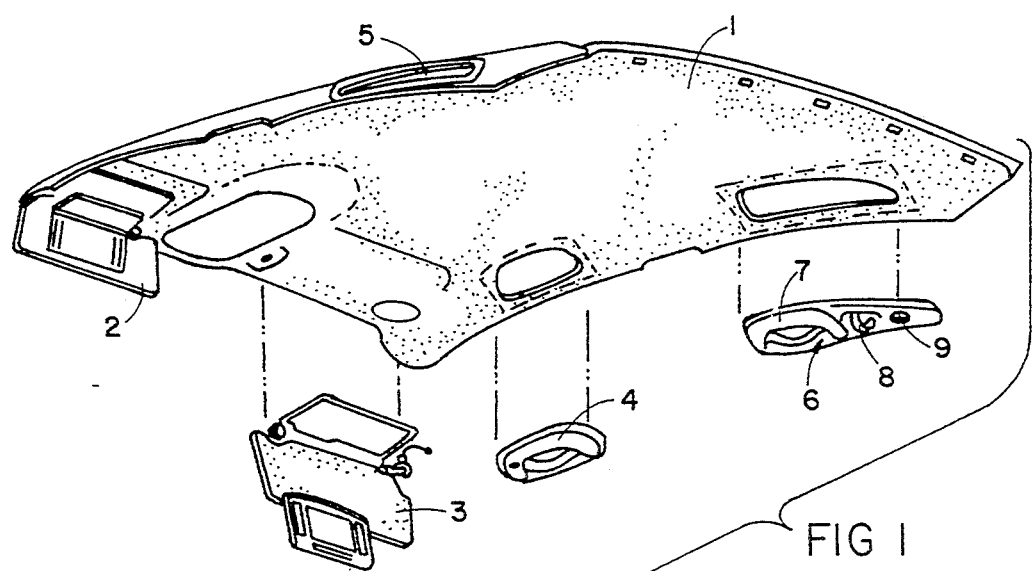
FIG. 1 is a perspective view of a header for an automotive vehicle disclosing various components of the interior of the vehicle and including our coat hook assembly.

Referring to the drawings, FIG. 1 discloses a header 1 on which is supported a plurality of components for the interior of the vehicle including the visor assemblies 2 and 3, the grabhandle assembly 4 and the rear rail assembly 6 which includes the grabhandle assembly 7, the coat hook assembly 8, and the courtesy light assembly 9. These assemblies are disclosed schematically for the purpose of disclosing the approximate position of the present coat hook assembly invention in relation to the vehicle. As disclosed, the position of the coat hook assembly 8 is immediately above the rear door on a four-door vehicle. It should be understood that on a two-door vehicle or even on a four-door vehicle, the coat hook assembly could be mounted alone without the grabhandle assembly 7 or the courtesy light assembly 9. It should also be understood that by "coat hook assembly" utilized throughout this description, is meant a hook on which a clothes hanger or any other item can be hung including coats mounted on a coat hanger but not limited thereto.

Figure 2:
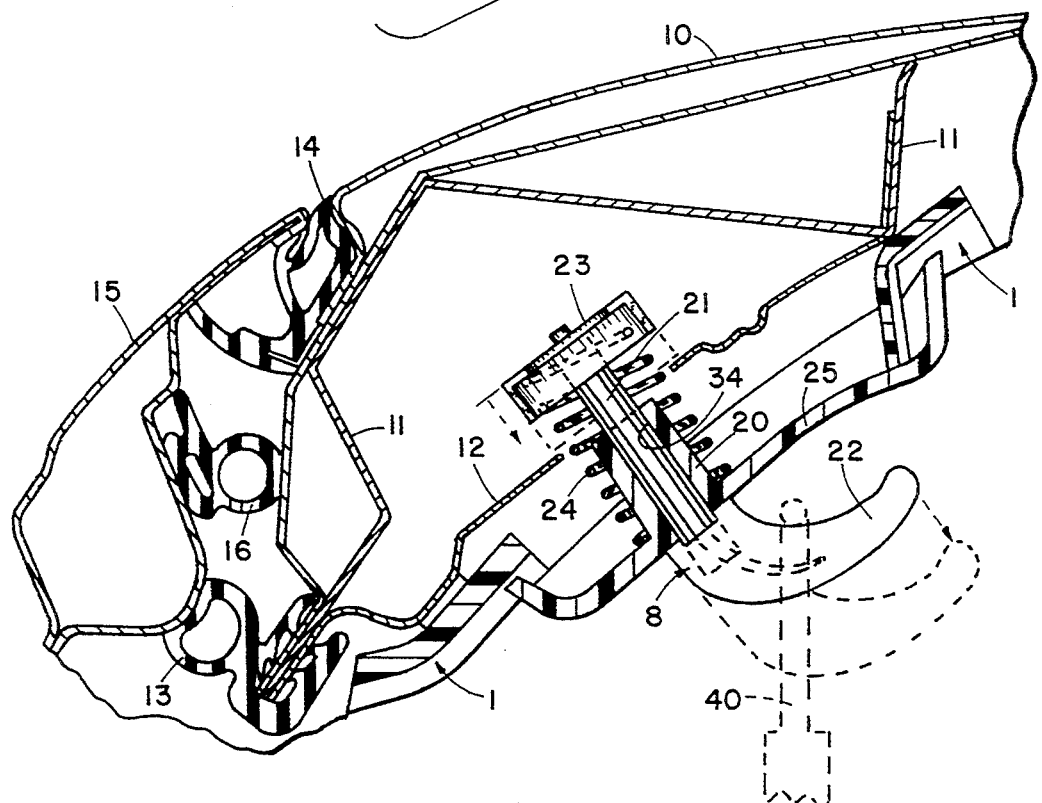
FIG. 2 is a cross-sectional, elevational view of a portion of the roof and header of a vehicle with one version of our spring biased coat hook mounted thereon.

Referring now to FIG. 2, reference number 10 designates the roof of the vehicle constructed of steel or other suitable materials such as fiberglass. Mounted under the roof 10 is the side rail 11 located along the top side edge of the vehicle roof. The roof and side rail assembly supports the header 1. A plate 12 extends between the two sides of the side rail assembly which also supports the door seals 13 and 14. A door of which only the side door window frame 15 is disclosed also includes a door seal 16. The door seals 13, 14, and 16 provide a seal against the side rail assembly 11 in the side of the roof 10.

The coat hook assembly 8 of this invention is supported by and forms a part of the rear rail assembly 6. It includes an elongated sleeve 20 extending at an angle upwardly toward the side rail assembly 11 and the roof 10. It slidably receives the stem 21 extending from the coat hook portion 22. On the end of the stem 21 is a spring retainer 23 for retaining the spring 24 which surrounds the stem 21 and the sleeve 20. Spring 24 is compressed between the wall 25 of the rear wall assembly and the spring retainer cap 23. As disclosed in FIG. 2, the hook portion 22 is adapted to support clothes hangers as designated by reference numeral 40.

FIGS. 3, 4, 5, and 6 disclose in greater detail the components forming the coat hook assembly 8. Referring to these figures, it will be noted that the coat hook is formed by an inner zinc die cast member 26 (FIG. 6) including the hook end 27 and a straight portion 28 of a quasi elliptical shape having the protrusions 29a and 29b. The top end 30 has a circular cross-section with the ears 31a and 31b extending from opposite sides thereof to provide a part of a bayonet connection to the cap 23.

Plastic sheath 32 is insert molded around the straight portion of the zinc cast member 26. It is provided with a plurality of ribs 33a, 33b, 33c, 33d, 33e, and 33f. The sheath is preferably a plastic material such as Celcon TM manufactured by Celanese Chemical Co. or Delrin TM manufactured by Du Pont de Nemours, E. I. & Co.

The hook portion 22 is also insert molded or otherwise secured over the hooked end 27 of the die cast zinc member 26, the material preferably being a Valox 508 TM manufactured by General Electric Co.

Figure 3:
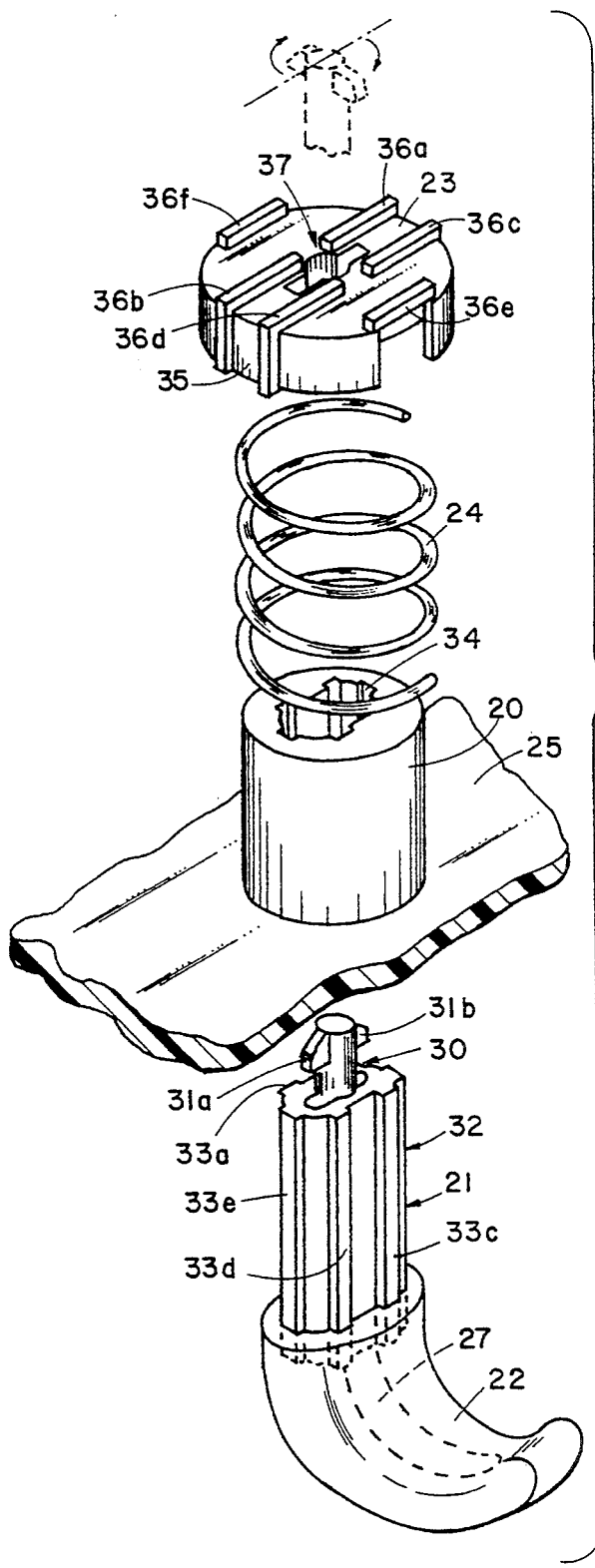
FIG. 3 is an exploded, perspective view of the FIG. 2 version of our coat hook invention.
Figure 4:
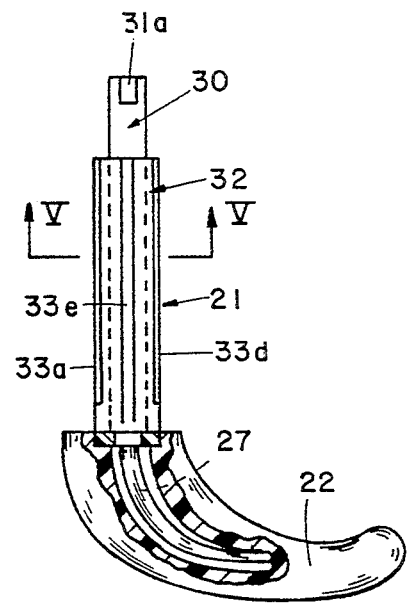
FIG. 4 is a side-elevational view of the coat hook element forming a part of the coat hook assembly of FIGS. 2 and 3.
Figure 5:
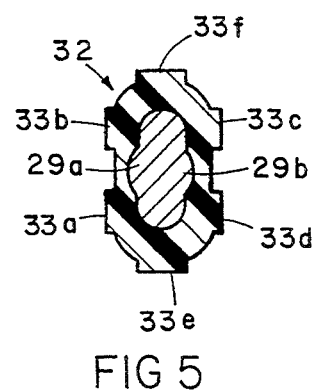
FIG. 5 is a cross-sectional view taken along the plane V—V of FIG. 4.

As clearly disclosed in both FIGS. 3 and 5, the opening 34 in the sleeve 20 is configured to correspond with the outer shape of the sheath 32. The shapes of the sheath 32 and opening 34 are provided to eliminate binding which is accomplished by the provision of the ribs formed on the sheath.

The cap 23 is constructed of a Nylon. It includes the top wall 34, a flange 35 depending downwardly from the top wall 34, and the ribs 36a, 36b, 36c, 36d, 36e, and 36f. These ribs add strength to the nylon cap. An opening 37 is provided in the top wall of 34 of the cap 23. It is shaped to receive the circular top end 30 with its ears 31a and 31b. The circular end 30 is sufficiently long so that it can be inserted through the opening 37 and the cap can be turned 90° whereby the ears 31a and 31b can be fitted between the ribs 36a, 36b, 36c, and 36d. This is accomplished by forcing the cap 23 downwardly against the bias of the spring 24, rotating the cap 23 90° and then releasing the same. The spring 24 then retains the cap on the end 30.

ASSEMBLY AND OPERATION

Having described the details of the preferred embodiment as disclosed in FIGS. 1-6, the assembly and operation should be quite evident. The coat hook assembly 8 is assembled on the rear rail assembly 6 before it is secured to side rail assembly of the roof and the header. This is accomplished by inserting the stem 21 through the opening 34 of the sleeve 20. Then the coil spring 24 is inserted over the stem and sleeve 20 after which the cap 23 is inserted over the end 30 of the stem 21. In so doing, the spring 24 is compressed until the ears 31a, 31b extend over the ribs 36a, 36b, 36c, and 36d at which time the cap is rotated 90° which aligns the ears 31a and 31b with the gaps between the ribs 36a, 36b, 36c, and 36d. The cap is then released and the spring 24 forces the cap upwardly causing the ears 31a and 31b to be located between the ribs 36a, 36b, 36c, and 36d. This secures the coat hook to the rear rail assembly 6 which then is secured to the side rail assembly 11 of the roof and the header 1.

In operation, the clothes hangers are hooked over the coat hook portion 22. It is preferred that the coil spring 24 has just the proper amount of bias to permit the stem 21 to slide downwardly in the sleeve 20 as the clothes hangers are placed on the hook portion 22. This is illustrated in FIGS. 7a and 7b. Although the selection of the force of the coil spring 24 is preferred as discussed above, within the broadest aspect of this invention, the extension of the coat hook portion 22 can be accomplished by the operator pulling downwardly. For each of these purposes, the angle of the stem with relation to the vertical plane should be approximately 40°-45° or in other words, 45°-50° from a horizontal plane. These angles previde for the minimum amount of binding of the stem 21 in the opening 34 of the sleeve 20 while at the same time, permitting the optimum head room to prevent the striking of a passenger's head on the hook portion 22.

MODIFICATION

Another embodiment of my invention is disclosed in FIG. 8 wherein the side rail assembly, the plate 12, and the rear rail assembly 6a are the substantially same as previously described. In this embodiment, the rotatable hook member 50 which has a shape which is a mirror image of an "S." The hook member 50 again includes a zinc die cast member 51 about which is insert molded the body 52 which outwardly appears to have substantially the same shape as the coat hook portion 22 previously described in relation to FIGS. 1-6. Opposite the end of the body 52, which receives the clothes hangers, is an end which is pivotally mounted about the axis X forming a part of the rear rail assembly 6a. Thus, the coat hook member 50 includes two arms 53 and 54 which are located at an angle to each other and between which is located the spring 55 which is a coil spring having a coil portion 56 and the two arms 57 and 58. The arm 58 bears against the wall 25a of the rear rail assembly and the arm 55 extends under the juncture between the two arms 52 and 53 so as to bias the coat hook member 50 in a counterclockwise direction as viewed in FIG. 8.

In the embodiment of FIG. 8, the spring is preferably chosen to have a biasing force equivalent to that described in relation to the embodiment of FIGS. 1-6. So that as the number of clothes hangers added onto the coat hook member increases the coat hook member moves downwardly to provide a greater area which accommodates a greater number of clothes hangers.

Having described our invention in detail, it should be understood that although we have disclosed preferred embodiments, many variations can be made without departing from the spirit and scope of this invention all as defined in the appended claims.

The embodiments of the invention in which an exclusive property or privilege is claimed are defined as follows:

1. A coat hook assembly for an automobile vehicle having a roof with a header having a major portion thereof located on substantially a horizontal plane, said coat hook assembly having means for supporting it on said roof adjacent the periphery of the header and the edge of the roof whereby several clothes hangers are supportable on said coat hook assembly along the side of the vehicle comprising:

said means for supporting said coat hook including a support comprising an elongated sleeve extending at an inclined angle to said horizontal plane and having a centrally located bore slidably receiving an elongated stem on the end of which is a coat hook, the outer surface configuration of said stem including a plurality of ribs and the configuration of said bore of said sleeve corresponding thereto;

a coil spring biasing said coat hook toward said roof and header for normally positioning said coat hook in a first position close to said header;

said configuration of said stem and bore minimizing any binding between the wall of the bore of said sleeve and stem; said inclined angle, the configuration of said stem and bore, and said coil spring permitting linear movement of said stem and coat hook in a direction away from said roof and header in response to the force applied in a downward direction orthogonal to said horizontal plane by hanging clothes hangers on said coat hook whereby as the number of hangers hung on said hook is increase, a greater space between the coat hook and header is provided to permit said coat hook to accommodate several clothes hangers located side-by-side;

said coil spring located around said stem and sleeve and biasing said coat hook in a direction toward said first position;

a removable spring retainer cap secured to the end of said stem and sufficiently large to retain said coil spring located around said stem and sleeve whereby said coil spring biases said coat hook to said first position; and said retainer cap being removable whereby said coat hook assembly can be easily installed.

2. The coat hook assembly of claim 1 in which the cap is secured to said stem by a bayonet connection means.

3. The coat hook assembly of claim 1 in which said stem is formed by a metallic pin having a bushing molded around said pin.

4. The coat hook assembly of claim 3, in which said pin includes an end with one part of a bayonet connection means for mounting said spring retainer cap; said cap including another part of said bayonet connection means and being secured to said pin and retained thereon by a coil spring located around said stem.

5. The coat hook assembly of claim 1 in which the header lies substantially on a horizontal plane and said stem extends at an angle of 45° to 50° from said horizontal plane.

6. A coat hook assembly for an automobile vehicle having a roof with a header having a major portion thereof located on substantially a horizontal plane, said coat hook assembly having means for supporting it on said roof adjacent the periphery of the header and the edge of the roof whereby several clothes hangers are supportable on said coat hook assembly along the side of the vehicle comprising:

said means for supporting said coat hook assembly including a support comprising an elongated sleeve extending at an inclined angle to said horizontal plane and having a centrally located bore slidably receiving an elongated stem on the end of which is a coat hook, the outer surface configuration of said stem including a plurality of ribs and the configuration of said bore of said sleeve corresponding thereto;

a coil spring biasing said coat hook toward said roof and header for normally positioning said coat hook in a first position close to said header; and said configuration of said stem and bore minimizing any binding between the wall of the bore of said sleeve and stem; said inclined angle, the configuration of said stem and bore, and said coil spring permitting linear movement of said stem and coat hook in a direction away from said roof and header in response to the force applied in a downward direction orthogonal to said horizontal plane by hanging clothes hangers on said coat hook whereby as the number of hangers hung on said hook is increased, a greater space between the coat hook and header is provided to permit said coat hook to accommodate several clothes hangers located side-by-side.

7. The coat hook assembly of claim 6 in which the header lies substantially on a horizontal plane and said stem extends at an angle of 45°–50° from said horizontal plane.

* * * * *

UNITED STATES PATENT AND TRADEMARK OFFICE
CERTIFICATE OF CORRECTION

PATENT NO.  : 5,411,233
DATED       : May 2, 1995
INVENTOR(S) : Robert W. Grimes, III et al.

It is certified that error appears in the above-identified patent and that said Letters Patent is hereby corrected as shown below:

Column 4, line 17;
    "previde" should be --provide--.

Column 5, line 1;
    After "hook" insert --assembly--.

Column 5, line 22;
    "increase" should be --increased--.

Signed and Sealed this

Nineteenth Day of September, 1995

Attest:

BRUCE LEHMAN

Attesting Officer

Commissioner of Patents and Trademarks